US008612788B2

(12) United States Patent
Hsieh

(10) Patent No.: US 8,612,788 B2
(45) Date of Patent: Dec. 17, 2013

(54) COMPUTER DEVICE AND METHOD FOR CONTROLLING SUPPLY OF POWER TO AN INTERNET PROTOCOL CAMERA

(75) Inventor: Chih-Yuan Hsieh, Hsichih (TW)

(73) Assignee: Wistron Corporation, Taipei Hsien (TW)

( * ) Notice: Subject to any disclaimer, the term of this patent is extended or adjusted under 35 U.S.C. 154(b) by 168 days.

(21) Appl. No.: 12/830,189

(22) Filed: Jul. 2, 2010

(65) Prior Publication Data

US 2011/0016335 A1   Jan. 20, 2011

(30) Foreign Application Priority Data

Jul. 14, 2009   (TW) ................................ 98123724 A

(51) Int. Cl.
*G06F 1/26*   (2006.01)
(52) U.S. Cl.
USPC .... 713/324; 713/310; 348/207.1; 348/207.11
(58) Field of Classification Search
USPC .......... 713/300, 310, 324; 348/207.1, 207.11, 348/211.99, 211.1, 211.3, 211.5, 211.12, 348/372
See application file for complete search history.

(56) References Cited

U.S. PATENT DOCUMENTS

| | | | | |
|---|---|---|---|---|
| 6,473,071 | B2 * | 10/2002 | Liu | 345/168 |
| 7,797,462 | B2 * | 9/2010 | Falkenburg et al. | 710/16 |
| 2006/0119595 | A1 * | 6/2006 | Hsuan et al. | 345/211 |
| 2007/0063977 | A1 * | 3/2007 | Kuo | 345/168 |
| 2008/0104211 | A1 * | 5/2008 | Blumenfeld | 709/221 |
| 2008/0288707 | A1 * | 11/2008 | Nicolet | 710/310 |
| 2009/0094472 | A1 | 4/2009 | Lin | |

FOREIGN PATENT DOCUMENTS

| | | |
|---|---|---|
| CN | 1808338 | 7/2006 |
| CN | 1991660 | 7/2007 |
| CN | 101261535 | 9/2008 |
| TW | M283233 | 12/2005 |

OTHER PUBLICATIONS

Logitech QuickCam Pro 9000 Users Guide; Logitech; 2007.*
Office Action for Chinese Application No. 200910157997.0, dated Sep. 15, 2011.
Abridged English Translation of Office Action for Chinese Application No. 200910157997.0, dated Sep. 15, 2011.
English translation of pertinent parts of Taiwanese Office Action, TW Application No. 098123724.
Chinese Office Action; CN Application No. 200910157997.0; dated Jun. 27, 2012.
Taiwanese Office Action dated Apr. 30, 2013 for TW Application No. 098123724 and abridged English translation.

* cited by examiner

*Primary Examiner* — Glenn A Auve
(74) *Attorney, Agent, or Firm* — Steptoe & Johnson LLP

(57) ABSTRACT

A computer device having a power switch mechanism for an Internet protocol (IP) camera includes: a switch component for enabling manual switching of a power supply status of an IP camera; an embedded controller electrically coupled to the switch component for outputting a control signal indicating conduction or non-conduction of power in accordance with a status of the switch component; and a switch circuit coupled to the embedded controller and operable to open or close a route for supply of power to the IP camera in accordance with the control signal from the embedded controller. Since the embedded controller has a closed system characteristic and controls the switch circuit for making or breaking a route for supply of power to the IP camera, user control over the power supply status of the IP camera can be assured, and vulnerability of the IP camera to external threats can be reduced.

10 Claims, 3 Drawing Sheets

COMPUTER DEVICE AND METHOD FOR CONTROLLING SUPPLY OF POWER TO AN INTERNET PROTOCOL CAMERA

CROSS-REFERENCE TO RELATED APPLICATION

This application claims priority of Taiwanese application no. 098123724, filed on Jul. 14, 2009.

BACKGROUND OF THE INVENTION

1. Field of the Invention

This invention relates to a computer device and a method for controlling supply of power, more particularly to a computer device having a power switch mechanism for an Internet protocol camera and a method for controlling supply of power to an Internet protocol camera.

2. Description of the Related Art

A conventional notebook computer is usually equipped with an Internet protocol (IP) camera, which enables a user to transmit images to others conveniently. Consequently, the IP camera is now commonly used as a tool for videoconferencing and image sharing.

Referring to FIG. 1, a conventional computer device 9 has an IP camera 8, a central processor 90, a basic input/output system (BIOS) module 91, a power-supplying device 92, a peripheral controller 93, and a USB transmission interface 94. Image signals captured by the IP camera 8 are transmitted through the USB transmission interface 94 to the peripheral controller 93 for subsequent provision to an application. The IP camera 8 is supplied with power (Vcc) from the power-supplying device 92 through the USB transmission interface 94.

A disadvantage of the afore-described manner for supplying power to the IP camera 8 resides in that the user can easily forget to turn off the IP camera 8 after use, and consequently, in the event that the computer device 9 is hacked, the IP camera 8 remains vulnerable to hijacking and misuse. Moreover, the user is often unaware that the IP camera 8 has been hijacked, such as when a Trojan horse program for obtaining control of the IP camera 8 is loaded by an operating system or another program residing in the computer device 9 and enables the hacker to take control of the IP camera 8 subsequent to rebooting the computer device 9. The user can then unwittingly become involved in illegal recording and transmission of images. There is thus a need to improve user control over a power supply status of the IP camera 8 so as to prevent hijacking of the IP camera 8.

SUMMARY OF THE INVENTION

The intent of the present invention is to utilize an embedded controller having a closed system characteristic for controlling supply of power to an Internet protocol (IP) camera so that user control of a power supply status of the IP camera is improved, thus reducing vulnerability of the IP camera to hijacking.

Therefore, the object of the present invention is to provide a computer device having a power switch mechanism for an IP camera, and a method for controlling supply of power to an IP camera.

According to one aspect of the present invention, there is provided a computer device having a power switch mechanism for an Internet protocol (IP) camera. The computer device is adapted for coupling to an IP camera and for supplying power to the IP camera, and comprises a switch component, an embedded controller, and a switch circuit. The switch component is for enabling manual switching of a power supply status of the IP camera. The embedded controller is electrically coupled to the switch component for outputting a control signal indicating conduction or non-conduction of power in accordance with a status of the switch component. The switch circuit is coupled to the embedded controller and is operable to open or close a route for supply of power to the IP camera in accordance with the control signal from the embedded controller.

According to another aspect of the present invention, there is provided a method for controlling supply of power to an Internet protocol (IP) camera adapted to be performed by a computer device. The computer device is coupled to an IP camera, and includes an embedded controller. The method comprises the following steps:

(a) configuring the embedded controller to output to a switch circuit a control signal indicating conduction or non-conduction of power in accordance with manual switching of a power supply status of the IP camera; and (b) using the switch circuit to open or close a route for supply of power to the IP camera in accordance with the control signal.

According to yet another aspect of the present invention, there is provided a computer device having a power switch mechanism for an Internet protocol (IP) camera. The computer device is adapted for coupling to an IP camera and for supplying power to the IP camera, and comprises a switch circuit and an embedded controller. The switch circuit is manually operable to open or close a route for supply of power to the IP camera. The embedded controller is electrically coupled to the switch circuit for detecting a power supplying status of the switch circuit and, based on the power supplying status of the switch circuit, outputting a signal indicating a power supply status of the IP camera.

According to still another aspect of the present invention, there is provided a method for controlling supply of power to an Internet protocol (IP) camera that is adapted to be performed by a computer device. The computer device is coupled to an IP camera and includes an embedded controller. The method comprises the following steps:

(a) using a switch circuit that is manually operable to open or close a route for supply of power to the IP camera; and (b) configuring the embedded controller for detecting a power supplying status of the switch circuit and, based on the power supplying status of the switch circuit, outputting a signal indicating a power supply status of the IP camera so as to enable display of the power supply status of the IP camera.

The computer device and the method for controlling supply of power to an IP camera of the present invention provide the following advantages.

1. Since the embedded controller has a closed system characteristic, and such characteristic enables control of the switch circuit by the embedded controller for making or breaking a route for supply of power to the IP camera, the present invention assures user control over the power supply status of the IP camera. Vulnerability of the IP camera to hijacking is thus reduced.

2. Using the embedded controller to enable the power supply status of the IP camera to be displayed supports user notification of the power supply status of the IP camera.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
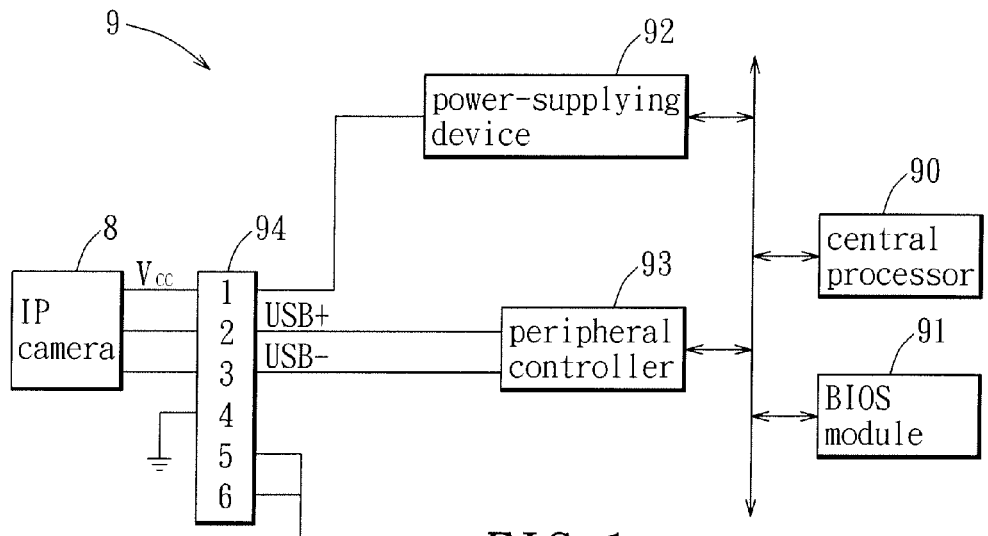
FIG. 1 is a schematic circuit block diagram of a conventional computer device.
Figure 2:
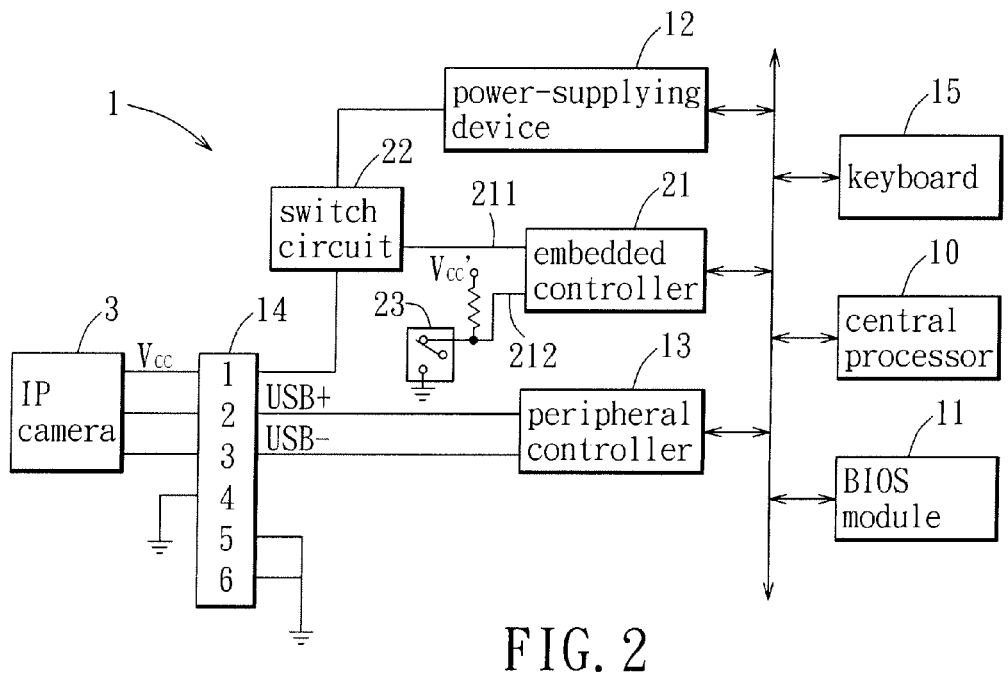
FIG. 2 is a schematic circuit block diagram of a first preferred embodiment of a computer device according to the present invention.

FIG. 2 illustrates the first preferred embodiment of a computer device having a power switch mechanism for an Internet protocol (IP) camera according to this invention. The computer device 1 is adapted for coupling to an IP camera 3, and includes a central processor 10, a basic input/output system (BIOS) module 11, a power-supplying device 12, a peripheral controller 13, a USB transmission interface 14, and a keyboard 15. The IP camera 3 transmits image signals corresponding to captured images through the USB transmission interface 14 to the peripheral controller 13 for subsequent provision to an application, and is supplied with power (Vcc) from the power-supplying device 12 through the USB transmission interface 14.

In contrast to a conventional computer device, the computer device 1 of this embodiment further includes an embedded controller (EC) 21, a switch circuit 22, and a switch component 23.

The switch component 23 is for enabling manual switching of a power supply status of the IP camera 3. The embedded controller 21 is electrically coupled to the switch component 23 for outputting a control signal indicating conduction or non-conduction of power in accordance with a status of the switch component 23. The switch circuit 22 is coupled to the embedded controller 21 and is operable to open or close a route for supply of power (Vcc') from the power-supplying device 12 to the IP camera 3 in accordance with the control signal from the embedded controller 21.

Since the embedded controller 21 is a proprietary product, and a manner in which the embedded controller 21 communicates with the BIOS module 14 is not publicly disclosed, the embedded controller 21 has a closed system characteristic, and such characteristic enables control of the switch circuit 22 by the embedded controller 21 for making or breaking a route for supply of power to the IP camera 3. In other words, only a user of the computer device 1 has ultimate control over operation of the switch circuit 22. The present invention thus assures user control over the power supply status of the IP camera 3, and consequently reduces vulnerability of the IP camera 3 to misuse by hackers and protects user privacy.

Figure 3:
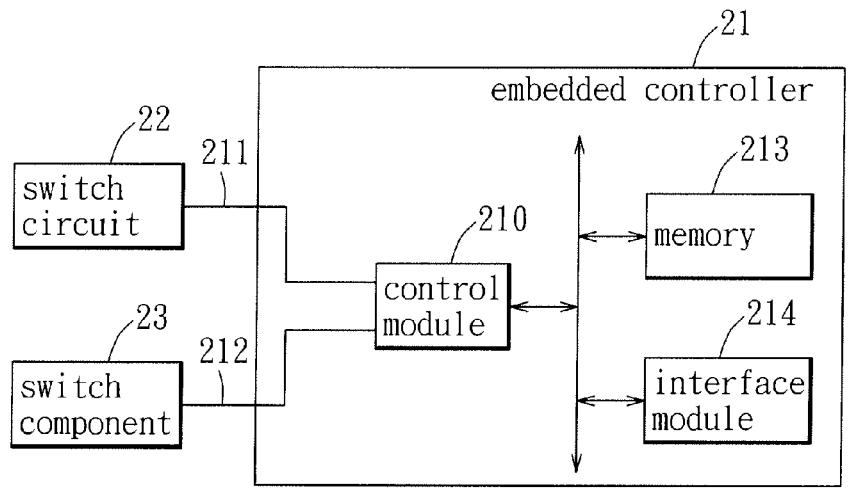
FIG. 3 is a schematic circuit block diagram of an embedded controller of the computer device of FIG. 2.

Referring to FIG. 3, the embedded controller 21 of this embodiment is an embedded keyboard controller having a control module 210, a memory 213, an interface module 214, a first pin 211 electrically coupled to the switch circuit 22, and a second pin 212 electrically coupled to the switch component 23. The control module 210 loads a program stored in the memory 213 for performing the method for controlling supply of power to an IP camera according to the present invention. The first and second pins 211,212 serve as GPIO pins of the embedded controller 21. The interface module 214 is for processing input from the keyboard 15, and will not be further discussed herein since it is not essential to this invention.

Referring to FIGS. 2 and 3, the control module 210 accepts both software and hardware control modes for controlling the switch circuit 22. In the software control mode, the control module 210 utilizes a software program residing in the memory 213 to receive a signal for determining whether the switch circuit 22 is to be controlled to open or close a route for supply of power (Vcc) to the IP camera 3. In contrast, in the hardware control mode, the control module 210 utilizes the status of the switch component 23 for determining whether the switch circuit 22 is to be controlled to open or close a route for supply of power (Vcc) to the IP camera 3.

When the computer device 1 is operated in the hardware control mode, the user manually switches the switch component 23 to an ON status, in which the IP camera 3 is to be supplied with power (Vcc), or to an OFF status, in which the IP camera 3 is not to be supplied with power (Vcc). A change in the status of the switch component 23 causes a voltage of the second pin 212 to be controlled to a high or low voltage, and the control module 210, in response, outputs through the first pin 211 the control signal indicating conduction or non-conduction of power according to the status of the switch component 23 that is reflected in the voltage of the second pin 212. The switch circuit 23 then makes or breaks a route for supply of power (Vcc) to the IP camera 3 in accordance with the control signal.

Figure 4:
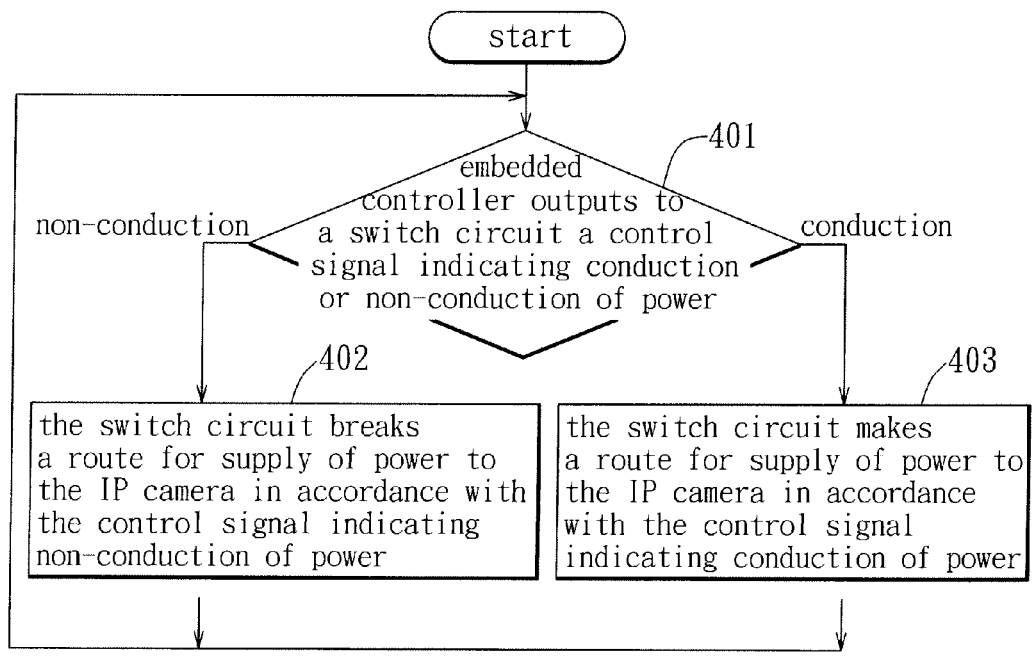
FIG. 4 is a flowchart of a preferred embodiment of a method for controlling supply of power to an IP camera according to the present invention.

Referring to FIGS. 2 and 4, the preferred embodiment of a method for controlling supply of power to an IP camera according to the present invention is adapted to be performed by the computer device 1 and includes the following steps.

In step 401, the embedded controller 21 is configured to output to the switch circuit 22 the control signal indicating conduction or non-conduction of power in accordance with the status of the switch component 23. When the control signal outputted to the switch circuit 22 indicates non-conduction of power, the flow proceeds to step 402. Otherwise, the flow proceeds to step 403.

In step 402, the switch circuit 22 breaks the route for supply of power (Vcc) to the IP camera 3 in accordance with the control signal indicating non-conduction of power.

In step 403, the switch circuit 22 makes the route for supply of power (Vcc) to the IP camera 3 in accordance with the control signal indicating conduction of power.

Figure 5:
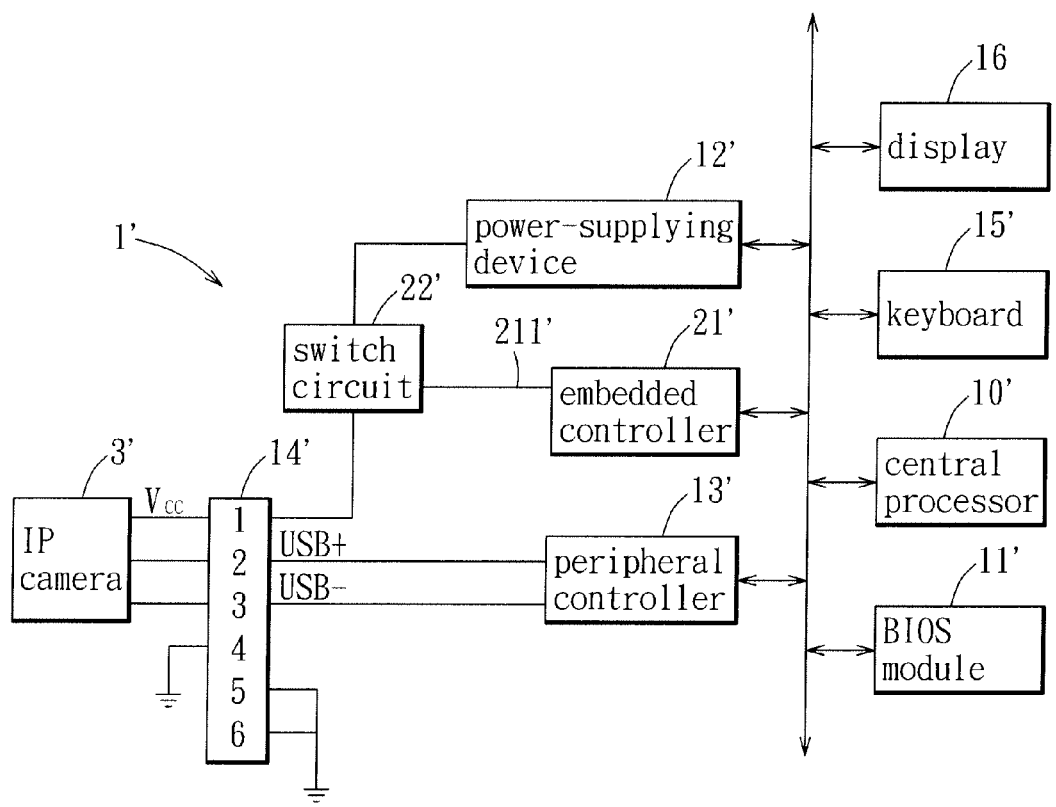
FIG. 5 is a schematic circuit block diagram of a second preferred embodiment of a computer device according to the present invention.

Referring to FIG. 5, the second preferred embodiment of the computer device 1' according to the present invention includes a central processor 10', a BIOS module 11', a power-supplying device 12' a peripheral controller 13', a USB transmission interface 14', a keyboard 15', an embedded controller 21', a switch circuit 22', and an IP camera 3'. Since the functions and configurations of these components are similar to those of the first preferred embodiment as shown in FIG. 2, detailed explanations of the same are omitted for the sake of brevity.

In contrast to the first preferred embodiment, the second preferred embodiment of the computer device 1' includes a display 16, the embedded controller 21' only needs one of the GPIO pins 211', and the switch circuit 22' is configured to be manually operable for making or breaking the route for supply of power (Vcc) to the IP camera 3' such that the power supply status of the IP camera 3' is manually switched through the switch circuit 22'. The control module 210 (see FIG. 3) of the embedded controller 21' detects the power supply status of the IP camera 3' through the first pin 211', and outputs a signal indicating the power supply status to the computer device 1' for subsequent display of the power supply status on the display 16.

The second preferred embodiment of the method for controlling supply of power to an IP camera is performed by the computer device 1' and includes the steps of first configuring the embedded controller 21' to detect the power supplying status of the switch circuit 22', which indicates the power supply status of the IP camera 3', and subsequently configuring the embedded controller 21' to output a signal indicating the power supply status of the IP camera 3' to the computer device 1' in accordance with the power supplying status of the switch circuit 22'. The computer device 1' then displays the power supply status of the IP camera 3' on the display 16 so as to notify the user.

It should be noted that the first preferred embodiment of the computer device 1 can include a display (not shown), and the embedded controller 21 can be configured to output the control signal indicating the power supply status of the IP camera 3 to the computer device 1 such that the computer device 1 displays the power supply status on the display.

In summary, the computer device 1,1' and method for controlling supply of power to an IP camera 3,3' provide the following advantages.

1. Since the embedded controller 21 has a closed system characteristic, and such characteristic ensures control of the switch circuit 22 by the embedded controller 21 for making or breaking a route for supply of power to the IP camera 3, the present invention assures user control over the power supply status of the IP camera 3, and consequently reduces vulnerability of the IP camera 3 to hijacking and protects user privacy.

2. Using the embedded controller 21' to enable display of the power supply status of the IP camera 3' on the display 16 of the computer device 1' allows the user to determine easily the power supply status of the IP camera 3', and reminds the user to turn off the IP camera 3', thereby preventing hijacking of the IP camera 3'.

3. Incorporating the GPIO pins 211,211', 212 of the embedded controller 21,21' and the switch circuit 22,22' into the computer device 1,1' incurs limited added fabrication costs, and provides a security utility that is user-friendly.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A computer device having a power switch mechanism for an Internet protocol (IP) camera, said computer device being adapted for coupling to an IP camera and for supplying power to the IP camera, said computer device comprising:
   a switch component for enabling manual switching of a power supply status of the IP camera;
   an embedded controller electrically and directly coupled to said switch component for outputting a control signal indicating conduction or non-conduction of power in accordance with a status of said switch component; and
   a switch circuit coupled to said embedded controller and operable to open or close a route for supply of power to the IP camera in accordance with said control signal from said embedded controller;
   wherein, said embedded controller is configured to enable display of a power supply status of the IP camera on a display of said computer device, to allow the user to determine the power supply status of the IP camera, and to remind the user to turn off the IP camera.

2. The computer device having a power switch mechanism for an IP camera as claimed in claim 1, wherein said embedded controller includes a control module, a first pin electrically coupled to said switch circuit, and a second pin electrically coupled to said switch component.

3. The computer device having a power switch mechanism for an IP camera as claimed in claim 2, wherein said control module of said embedded controller outputs a signal indicating the power supply status of the IP camera for enabling display of the power supply status.

4. The computer device having a power switch mechanism for an IP camera as claimed in claim 1, wherein said embedded controller is an embedded keyboard controller.

5. A computer device having a power switch mechanism for an Internet protocol (IP) camera, said computer device being adapted for coupling to the IP camera and for supplying power to the IP camera, said computer device comprising:
   a power-supplying device;
   a switch circuit that is electrically and directly coupled between the IP camera and said power-supplying device, and that is manually operable to open or close a route for supply of power to the IP camera; and
   an embedded controller electrically and directly coupled to said switch circuit for detecting a power supplying status of said switch circuit and, based on the power supplying status of said switch circuit, outputting a signal indicating a power supply status of the IP camera;
   wherein, said embedded controller is configured to enable display of a power supply status of the IP camera on a display of said computer device, to allow the user to determine the power supply status of the IP camera, and to remind the user to turn off the IP camera.

6. The computer device having a power switch mechanism for an IP camera as claimed in claim 5, wherein said embedded controller is an embedded keyboard controller.

7. A method for controlling supply of power to an Internet protocol (IP) camera adapted to be performed by a computer device, the computer device being coupled to an IP camera, and including an embedded controller, said method comprising the following steps:
   (a) configuring the embedded controller to output directly to a switch circuit a control signal indicating conduction or non-conduction of power in accordance with manual switching of a power supply status of the IP camera;
   (b) using the switch circuit to open or close a route for supply of power to the IP camera in accordance with the control signal; and
   (c) configuring the embedded controller to enable display of a power supply status of the IP camera on a display of the computer device, to allow the user to determine the power supply status of the IP camera, and to remind the user to turn off the IP camera.

8. The method for controlling supply of power to an IP camera as claimed in claim 7, wherein, in step (a), the embedded controller is configured to output the control signal indicating conduction or non-conduction of power in accordance with a status of a switch component for manually switching the power supply status of the IP camera.

9. The method for controlling supply of power to an IP camera as claimed in claim 7, wherein, in step (c), the embedded controller is further configured to output a signal indicating the power supply status of the IP camera for enabling the display of the power supply status of the IP camera on the display of the computer device.

10. A method for controlling supply of power from a power-supplying device to an Internet protocol (IP) camera adapted to be performed by a computer device, the computer device being coupled to the IP camera, and including an embedded controller and a switch circuit that is electrically and directly coupled between the IP camera and the power-supplying device, said method comprising the following steps:
- (a) using the switch circuit that is manually operable to open or close a route for supply of power to the IP camera;
- (b) configuring the embedded controller for detecting a power supplying status of the switch circuit and, based on the power supplying status of the switch circuit, outputting a signal indicating a power supply status of the IP camera; and
- (c) configuring the embedded controller to enable display of a power supply status of the IP camera on a display of the computer device, to allow the user to determine the power supply status of the IP camera, and to remind the user to turn off the IP camera.

* * * * *